(12) United States Patent
Wang (10) Patent No.: US 7,520,709 B2
(45) Date of Patent: Apr. 21, 2009

(54) LOCKING HEAD FOR A BOLT ASSEMBLY

(76) Inventor: Chiu-Kuei Wang, No. 152, Shunfan Rd., Dajia Town, Taichung County (TW)

( * ) Notice: Subject to any disclaimer, the term of this patent is extended or adjusted under 35 U.S.C. 154(b) by 326 days.

(21) Appl. No.: 11/598,127

(22) Filed: Nov. 13, 2006

(65) Prior Publication Data

US 2008/0112773 A1  May 15, 2008

(51) Int. Cl.
*F16B 41/00* (2006.01)
(52) U.S. Cl. .................. 411/396; 411/910; 70/230; 70/231; 70/386
(58) Field of Classification Search ............... 411/396, 411/910; 70/229–232, 386
See application file for complete search history.

(56) References Cited

U.S. PATENT DOCUMENTS

| 1,516,453 | A | * | 11/1924 | Nichols | 70/231 |
| 1,678,174 | A | * | 7/1928 | White | 70/231 |
| 1,843,072 | A | * | 1/1932 | Stone | 70/231 |
| 4,441,344 | A | * | 4/1984 | Kurpershoek | 70/231 |
| 4,848,112 | A | * | 7/1989 | Graber et al. | 70/231 |
| 5,121,618 | A | * | 6/1992 | Scott | 70/367 |
| 5,295,376 | A | * | 3/1994 | Myers | 70/369 |
| 5,388,434 | A | * | 2/1995 | Kalis | 70/58 |
| 6,865,914 | B2 | * | 3/2005 | Irgens et al. | 70/231 |
| 7,243,514 | B2 | * | 7/2007 | Frantz | 70/58 |

* cited by examiner

*Primary Examiner*—Flemming Saether (57) ABSTRACT

A bolt assembly includes a head having a lock connected thereto which includes an eccentric rod with a curved outer periphery and a flat surface. A bead is retractably connected to an outer periphery of the curved outer periphery. A shank has teeth in an outer periphery thereof and has an end plate which has recesses such that the curved outer periphery of the eccentric rod can be selectively and removably engaged with one of the recesses by using a key to operate the lock. A cover is connected to an underside of the head. The shank is co-rotated with the head when the curved outer periphery of the eccentric rod is engaged with one of the recesses. When the curved outer periphery of the eccentric rod is removed from the recesses, the head is independently rotated relative to the shank so that the bolt assembly cannot be unscrewed.

5 Claims, 8 Drawing Sheets

LOCKING HEAD FOR A BOLT ASSEMBLY

FIELD OF THE INVENTION

The present invention relates to a locking head of a bolt assembly wherein a lock is connected to the head of the bolt assembly so that the head and the shank of the bolt can be rotated together or individually.

BACKGROUND OF THE INVENTION

Figure 1:
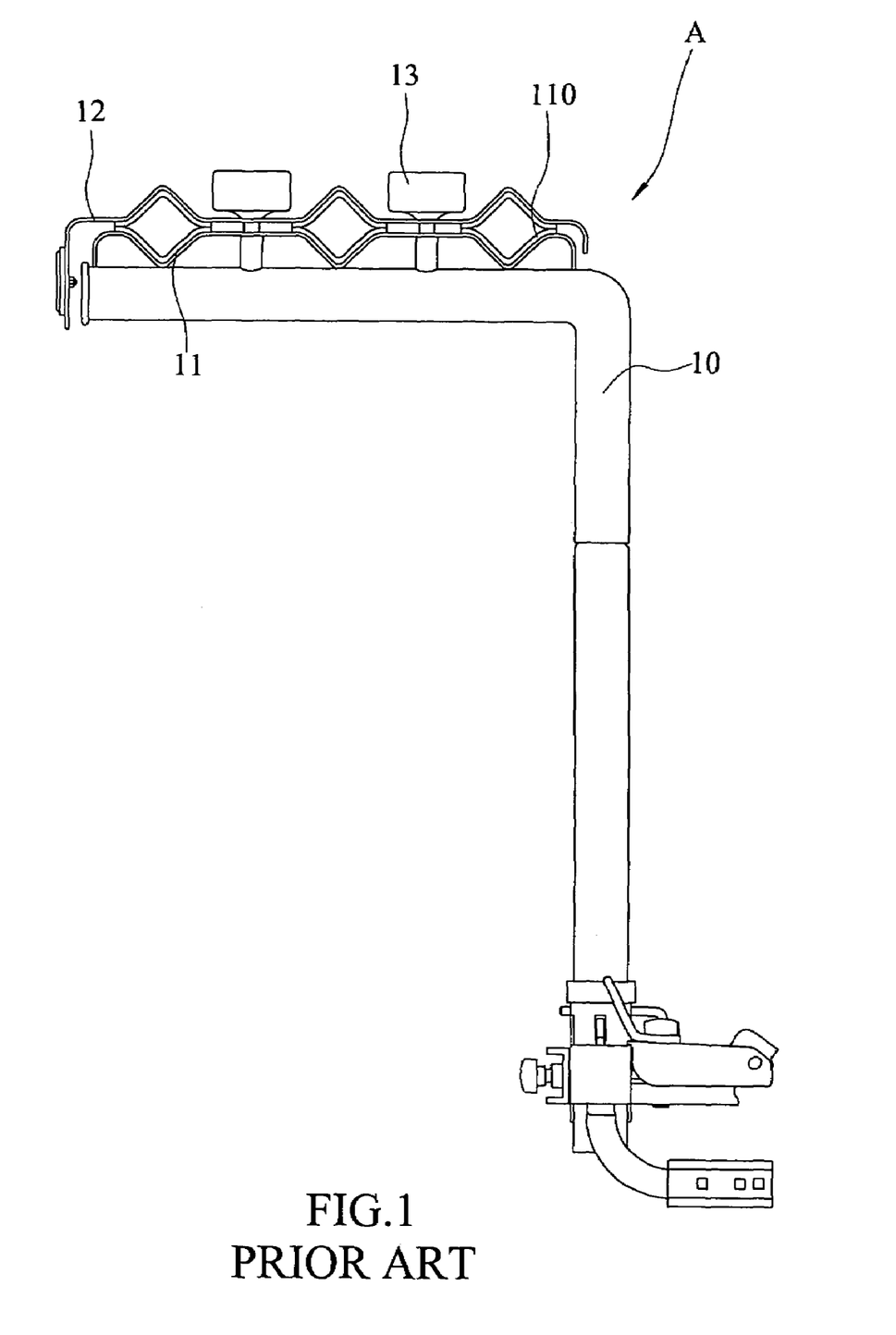
FIG. 1 is a side view to show a conventional bicycle rack.
Figure 2:
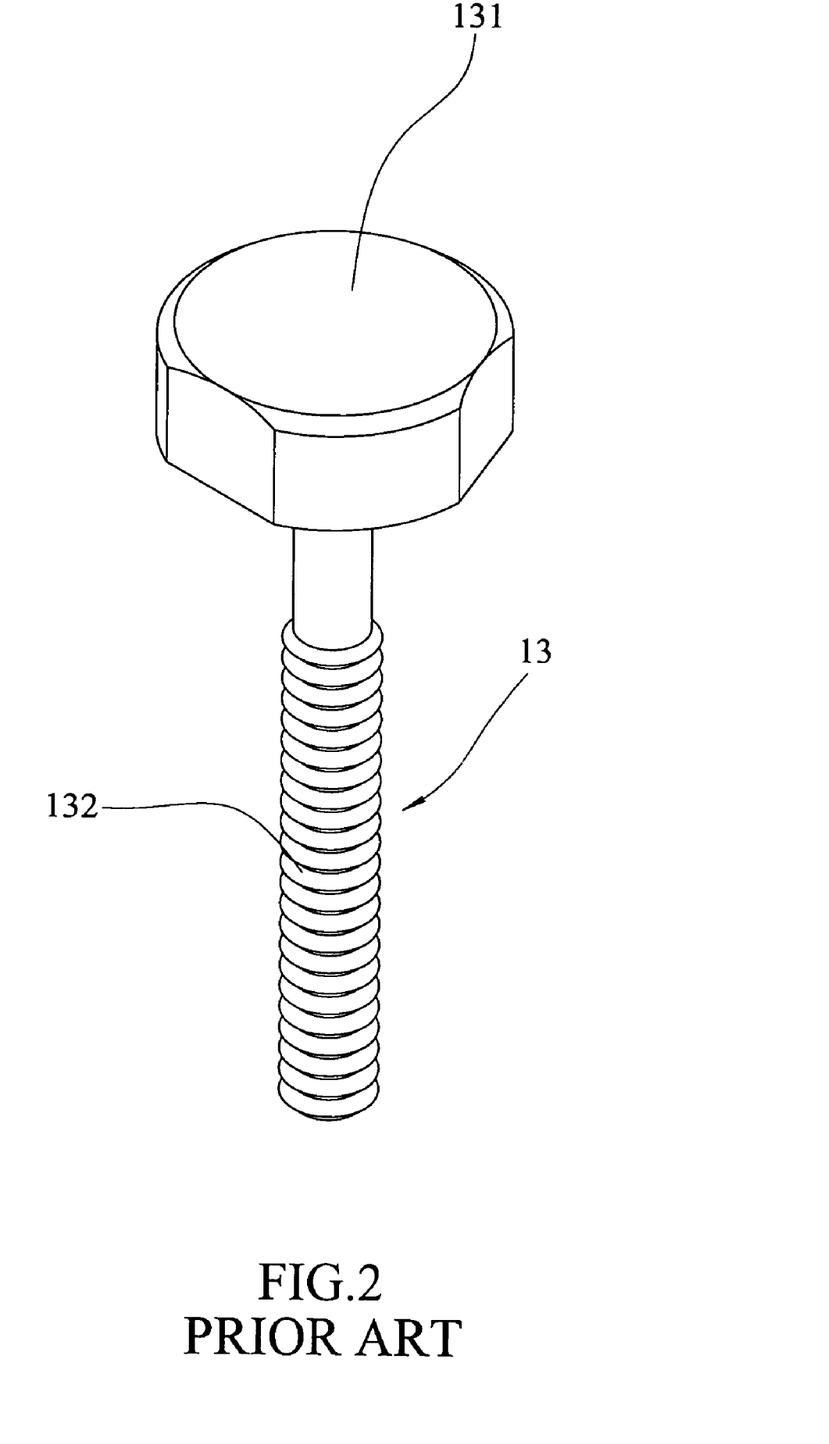
FIG. 2 is a perspective view to show the bolts for the conventional bicycle rack.
Figure 3:
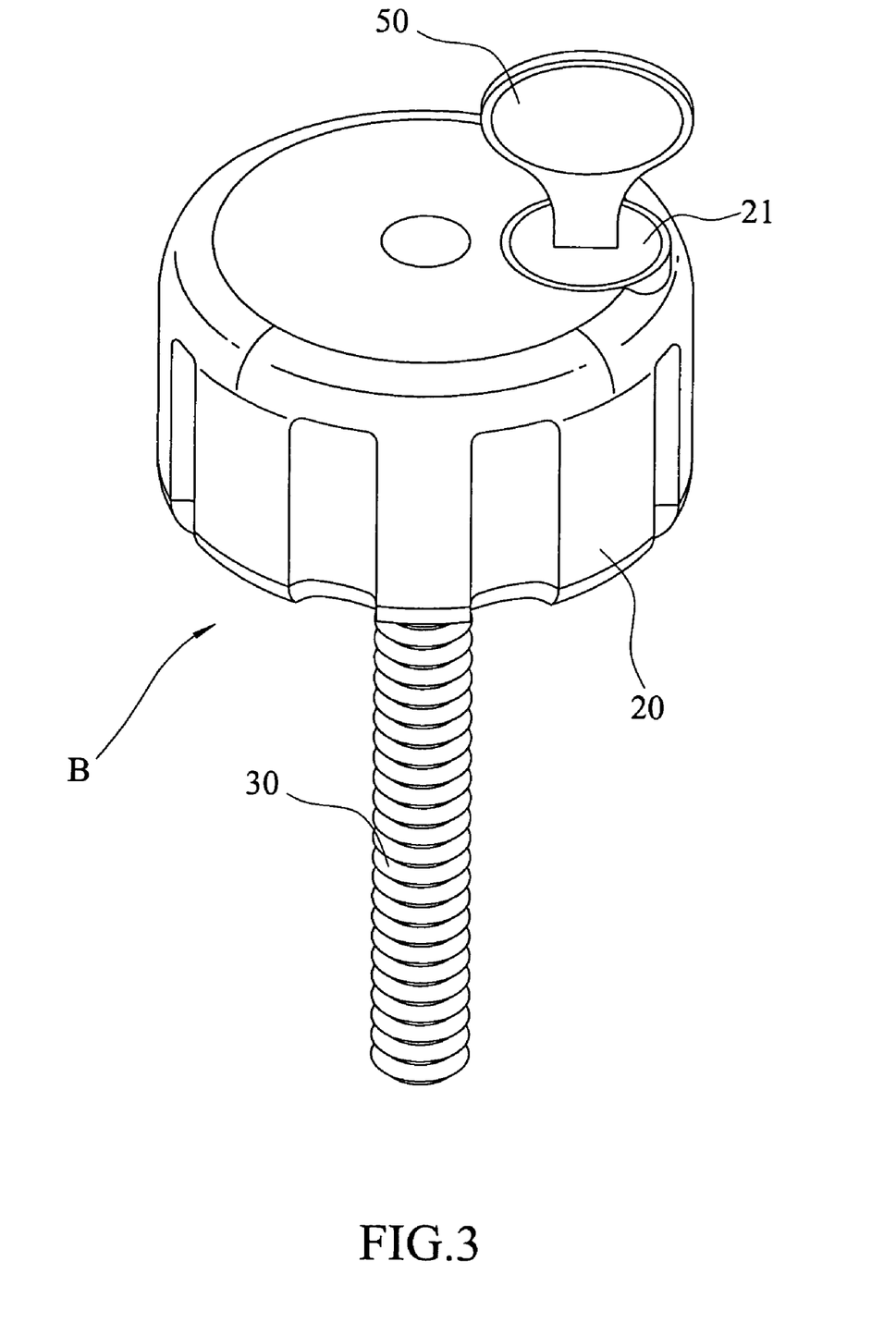
FIG. 3 is a perspective view to show the bolt assembly of the present invention.
Figure 4:
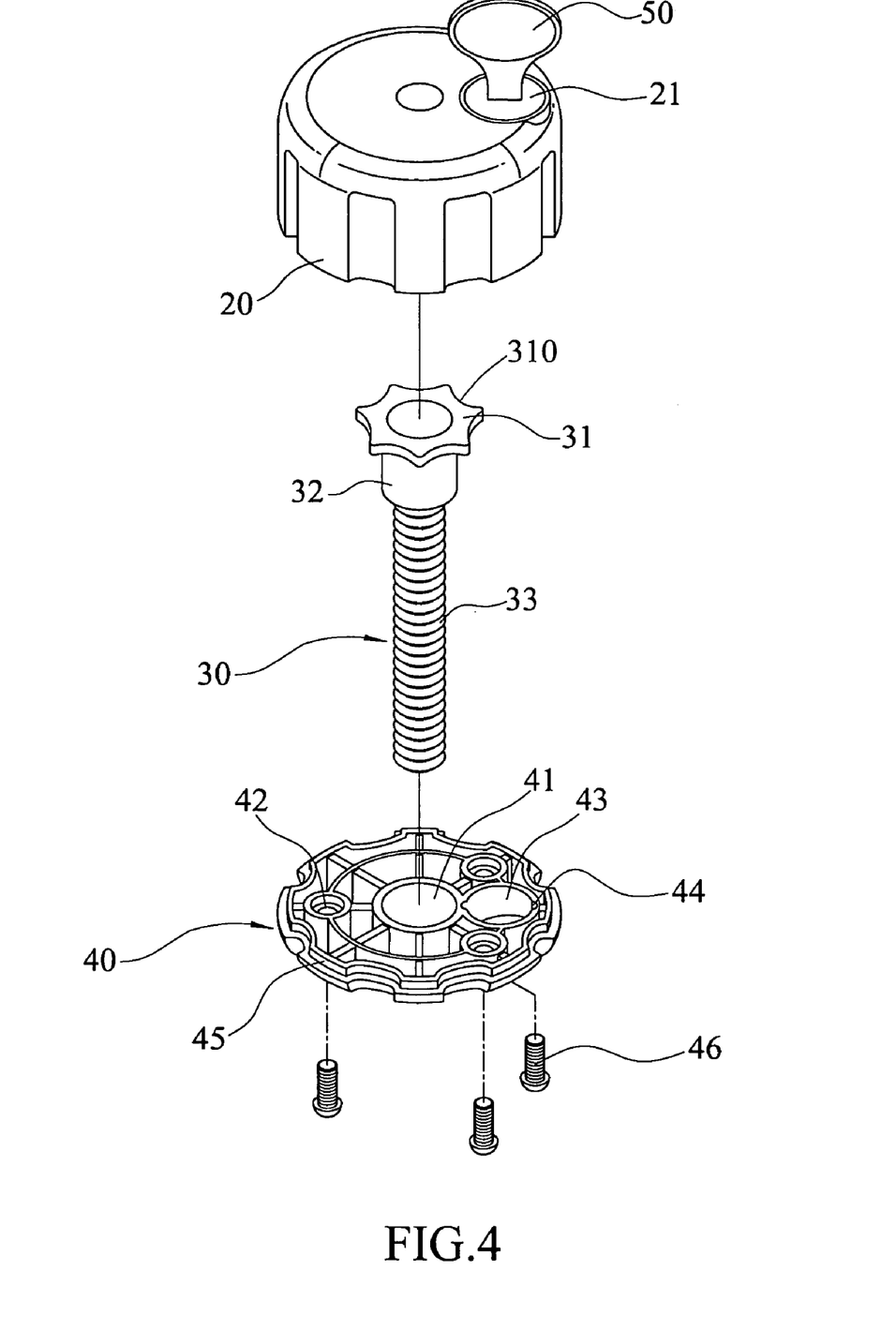
FIG. 4 is an exploded view to show the bolt assembly of the present invention.

A conventional bicycle rack "A" attached to a rear end of a vehicle is shown in FIG. 1 and generally includes a vertical tube 10 which has one end connected to the vehicle and a horizontal section is connected to the other end of the vertical tube 10. A lower member 11 is fixed on the horizontal section and includes a plurality of recesses 110 defined in a top thereof. An upper member 12 is mounted on the lower member 11 and includes a plurality of recesses defined in an underside thereof, the recesses of the upper member 12 are cooperated with the recesses 110 of the lower member 11 so as to clamp bicycle frames (not shown) between the upper and lower members 12, 11. A plurality of bolts 13 as shown in FIG. 2 extend through the upper and lower members 12, 11 and are connected to the horizontal section to secure the bicycle frames by teeth 132 on the bolts 13. However, the heads 131 of the bolts 13 can be easily unscrewed by any one without permission so that the bicycles on the bicycle rack "A" might be stolen by unscrewing the bolts 13.

The present invention intends to provide a locking head for a bolt assembly wherein the head of the bolt can be set to be freely rotatable relative to the shank of the bolt such that the bolt cannot be unscrewed.

SUMMARY OF THE INVENTION

The present invention relates to a bolt assembly which comprises a head having a lock connected thereto which has an eccentric rod which includes a curved outer periphery with a bead retractably connected thereto, and a flat surface. A key is removably inserted into the lock so as to control the eccentric rod. A shank has teeth defined in an outer periphery thereof and an end plate is connected to an end of the shank. The end plate has a plurality of recesses defined in an outer periphery thereof and the curved outer periphery of the eccentric rod is removably engaged with one of the recesses. A cover has a central passage through which the shank extends. The cover is fixed to an underside of the head and has a chamber which communicates through a top of the cover. Two detents are diametrically opposite defined in an inner periphery of the chamber and the eccentric rod is rotatably inserted in the chamber, the bead is engaged with one of the two detents. The end plate is located in a gap between the underside of the head and the cover. When the eccentric rod is engaged with one of the recesses of the end plate, the shank is co-rotated with the head. When the eccentric rod is disengaged from the recesses of the end plate, the head is rotated while the shank is remained still.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 3, 4, 5A and 6A, the bolt assembly "B" of the present invention comprises a head 20 having a lock 21 connected thereto and the lock 21 includes an eccentric rod 211 which includes a curved outer periphery 2111 and a flat surface 2112. A bead 212 is retractably connected to an outer periphery of the curved outer periphery 2111 and a key 50 can be removably inserted into the lock 21 and controls rotation of the eccentric rod 211. The head 20 includes a plurality of ridge and grooves so that the user can easily hold the head 20 and rotates the head 20.

A shank 30 has teeth 33 defined in an outer periphery thereof and an end plate 31 is connected to an end of the shank 30. The end plate 31 has a plurality of recesses 310 defined in an outer periphery thereof and the curved outer periphery 2111 of the eccentric rod 211 can be removably engaged with one of the recesses 310. A tube 32 is connected to an underside of the end plate 31 and the shank 30 extends out from the tube 32.

A cover 40 has a central passage 41 through which the shank 30 extends and three apertures 42 are defined through the cover 40. The tube 32 is engaged with an inner periphery of the central passage 41 of the cover 40. Three screws 46 extend through the apertures 42 and are connected to the underside of the head 20. A serrated flange 45 extends from a top of the cover 40 so as to be engaged with an inner periphery of the head 20. A gap is defined between the cover 40 and the underside of the head 20 so that the end plate 31 is rotatably located in the gap.

Figure 5:
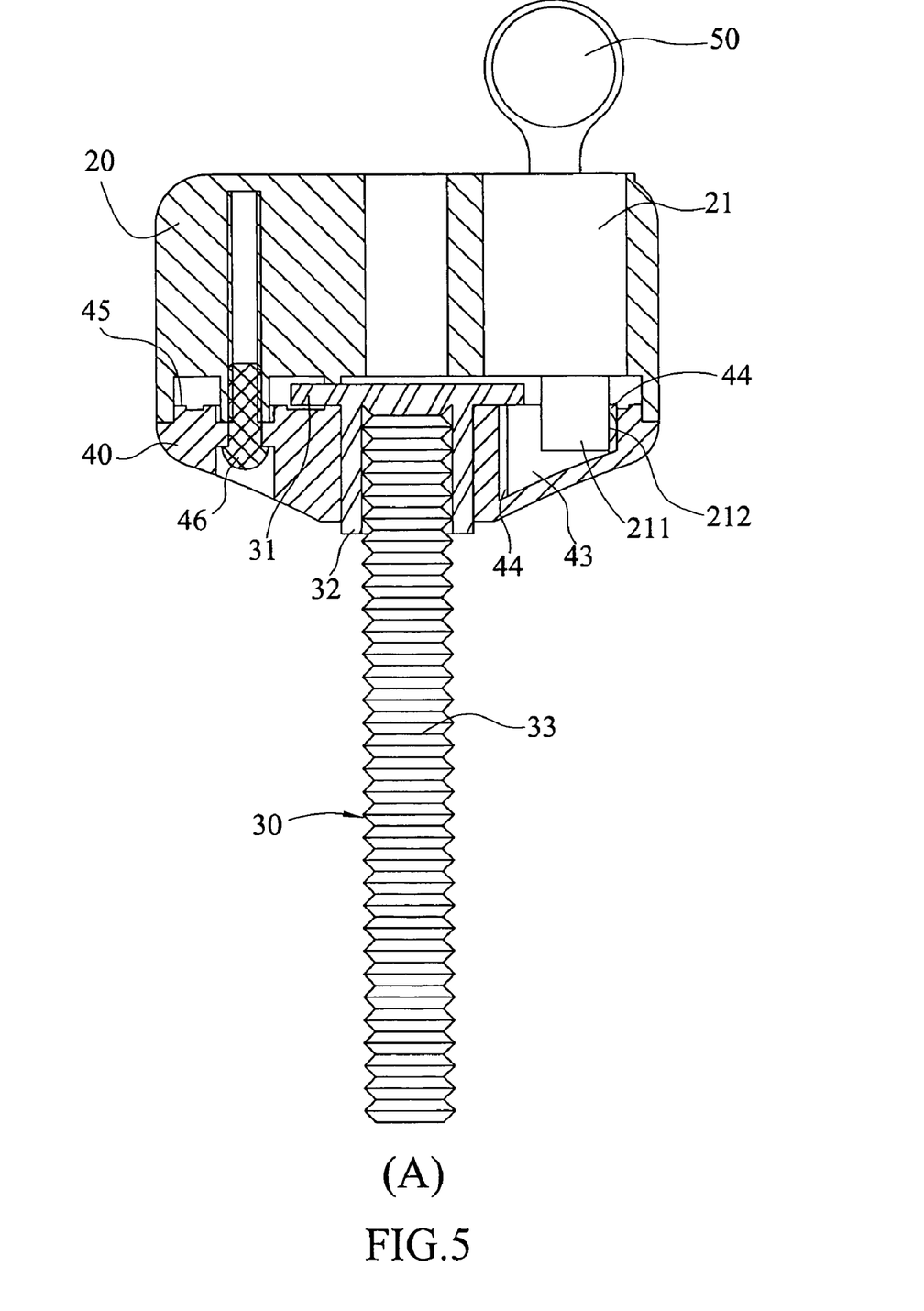
FIG. 5A is a cross sectional view of the bolt assembly of the present invention, wherein the eccentric rod of the lock is disengaged from the recesses of the end plate of the shank.
FIG. 5B is a cross sectional view of the bolt assembly of the present invention, wherein the eccentric rod of the lock is engaged with one of the recesses of the end plate of the shank.
Figure 6:
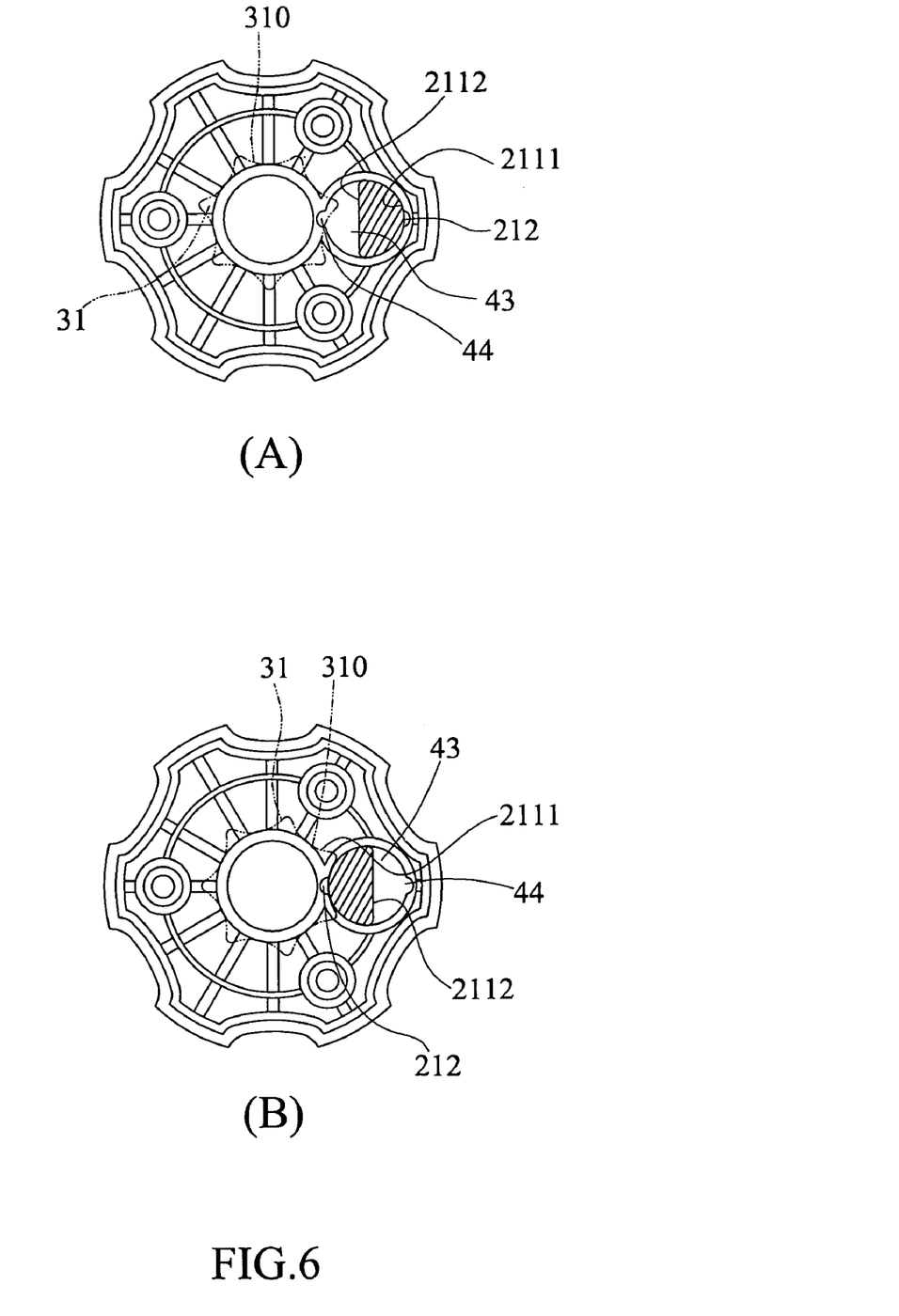
FIG. 6A is a cross sectional view of the bolt assembly of the present invention, wherein the bead on the eccentric rod of the lock is engaged with one of the two detents and the eccentric rod of the lock is disengaged from the recesses of the end plate.
FIG. 6B is a cross sectional view of the bolt assembly of the present invention, wherein the bead on the eccentric rod of the lock is engaged with the other one of the two detents and the eccentric rod of the lock is engaged with one of the recesses of the end plate of the shank.

The cover 40 has a chamber 43 which communicates through a top of the cover 40 and the eccentric rod 211 is rotatably inserted in the chamber 43. Two detents 44 are diametrically opposite defined in an inner periphery of the chamber 43 and the bead 212 is engaged with one of the two detents 44. Another gap is defined between the flat surface 2112 of the eccentric rod 211 when the lock 21 is locked status. When the lock 21 is locked status, the head 20 is freely rotated while the end plate 31 and the shank 30 is not co-rotated with the rotation of the head 20.

As shown in FIGS. 5B and 6B, when the user users the key 50 to rotate the eccentric rod 211 to let the bead 212 be engaged with the other detent 44, the curved outer periphery 2111 of the eccentric rod 211 is engaged with one of the recesses 310 of the end plate 31 of the shank 30. When the head 20 is rotated, the shank 30 is co-rotated with the rotation of the head 20 so that the bolt assembly "B" is unscrewed.

Figure 7:
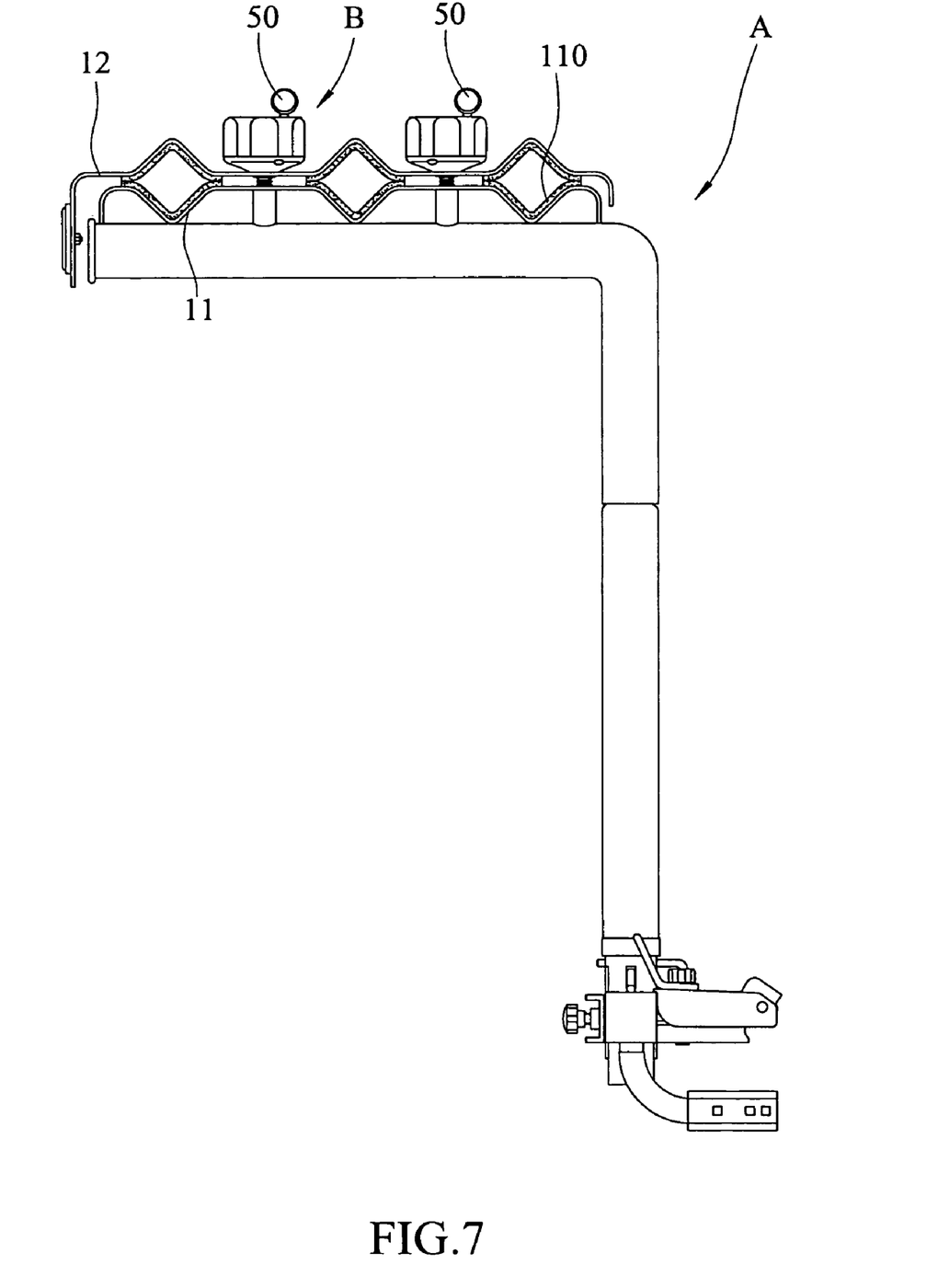
FIG. 7 is a side view to show that the bolt assemblies of the present invention are used to a bicycle rack.

FIG. 7 shows that the bolt assemblies "B" are used to securely connect the upper member 12 and the lower member 11 of the conventional bicycle rack "A" to clamp bicycle frames (not shown) in the recesses 110 between the upper and lower members 12, 11.

While we have shown and described the embodiment in accordance with the present invention, it should be clear to those skilled in the art that further embodiments may be made without departing from the scope of the present invention.

What is claimed is:

1. A bolt assembly comprising:
   a head having a lock connected thereto and the lock including an eccentric rod which includes a curved outer periphery and a flat surface, a bead retractably connected to an outer periphery of the curved outer periphery, a key removably inserted into the lock and controlling the eccentric rod;
   a shank having teeth defined in an outer periphery thereof and an end plate connected to an end of the shank, the end plate having a plurality of recesses defined in an outer periphery thereof and the curved outer periphery of the eccentric rod removably engaged with one of the recesses, and
   a cover having a central passage through which the shank extends, the cover fixed to an underside of the head and having a chamber which communicates through a top of the cover, two detents diametrically opposite defined in an inner periphery of the chamber, the eccentric rod rotatably inserted in the chamber and the bead engaged with one of the two detents, the end plate located in a gap between the underside of the head and the cover.

2. The assembly as claimed in claim 1, wherein a gap is defined between the flat surface and the end plate.

3. The assembly as claimed in claim 1, wherein the cover includes a plurality of apertures and screws extend through the apertures and are connected to the underside of the head.

4. The assembly as claimed in claim 1, wherein a flange extends from a top of the cover so as to be engaged with an inner periphery of the head.

5. The assembly as claimed in claim 1, wherein a tube is connected to an underside of the end plate and the shank extends out from the tube, the tube is engaged with an inner periphery of the central passage of the cover.

* * * * *